(12) United States Patent
Thielmann

(10) Patent No.: US 6,723,955 B2
(45) Date of Patent: Apr. 20, 2004

(54) CLEANING SYSTEM FOR WELDING TORCHES WHICH EFFECTS CLEANING BY MEANS OF COLD TEMPERATURE

(75) Inventor: Friedolin Thielmann, Haiger-Rodenbach (DE)

(73) Assignee: InterTech Systems, Inc., Rockford, IL (US)

( * ) Notice: Subject to any disclaimer, the term of this patent is extended or adjusted under 35 U.S.C. 154(b) by 0 days.

(21) Appl. No.: 10/178,066

(22) Filed: Jun. 21, 2002

(65) Prior Publication Data

US 2003/0024917 A1 Feb. 6, 2003

Related U.S. Application Data

(60) Provisional application No. 60/306,613, filed on Jul. 19, 2001.

(30) Foreign Application Priority Data

Jun. 21, 2001 (DE) .......................................... 201 10 155

(51) Int. Cl.[7] ................................................. B23K 9/32
(52) U.S. Cl. ................................ 219/136; 219/137.43
(58) Field of Search ............................ 219/136, 137.43, 219/74; 451/53; 901/42

(56) References Cited

U.S. PATENT DOCUMENTS

| | | | | |
|---|---|---|---|---|
| 2,833,913 A | * | 5/1958 | Bernard | 219/137.43 |
| 4,038,786 A | * | 8/1977 | Fong | 451/53 |
| 4,702,195 A | * | 10/1987 | Thielmann | 901/42 |
| 5,844,201 A | * | 12/1998 | Dibacco et al. | 219/137.43 |
| 6,034,351 A | * | 3/2000 | Sato et al. | 219/136 |

* cited by examiner

Primary Examiner—Clifford C. Shaw
(74) Attorney, Agent, or Firm—Pauley Petersen & Erickson

(57) ABSTRACT

A cleaning system process and apparatus for welding torches performs the cleaning by subjecting the welding torch, including the weld tip, nozzle and gas diffusers, to cooling. The cooling provides a temperature shock sufficient to loosen the weld spatter from the torch. In one embodiment the loosened spatter may then be carried away from the torch by either or both of positive or negative fluid pressure, for example an air blast or a vacuum line, respectively. The cooling may be done by subjecting the torch to a pressurized flow of coolant medium such as dry ice pellets or the like. The system may further cleanse the torch with an antispatter compound which can be applied by mixture with the coolant medium if desired. The cleaning system process is thorough, quick, subjects the torch to little stress, and improves performance of the nozzle including operation time between cleanings.

27 Claims, 2 Drawing Sheets

CLEANING SYSTEM FOR WELDING TORCHES WHICH EFFECTS CLEANING BY MEANS OF COLD TEMPERATURE

CROSS REFERENCE TO RELATED APPLICATION

This application claims the benefit of U.S. Provisional Application No. 60/306,613, filed Jul. 19, 2001, and German Utility Patent Application, Filed No. 201 10 155.6, filed Jun. 21, 2001.

FIELD OF THE INVENTION

The present invention relates to means and methods for cleaning welding torches.

SUMMARY OF THE INVENTION

The purpose of the cleaning system of the present invention is for cleaning of weld spatter over the entire area inside and outside of the nozzle assembly of a welding torch including the weld tip and gas diffusers. The system is suitable for welding guns used with special purpose welding machines, robotic welding systems and manual welding units.

During the cleaning cycle, the welding gun is positioned proximal to the cleaning unit and subjected to a cooling medium sufficient to cause thermal shock effective to loosen or separate the spatter from the nozzle assembly. This may be accomplished in one embodiment by the application of dry ice pellets to the nozzle assembly. Mechanical loosening may also be affected by this process. Advantageously, the cleaning effects a cooling of the nozzle assembly which aids in efficient welding operations. Further the cleaning gives little mechanical or abrasive strain to the nozzle assembly thus promoting longer life and economical cleaning of the nozzle assembly.

The cleaning unit may be a box and clamp assembly constructed to hold the nozzle assembly and contain the cooling medium. The box may be pneumatically or hydraulically operated to provide the delivery of the cooling medium under pressure. The loosened weld spatter may be subjected to fluid pressure, e.g. high pressure air, forced through the nozzle assembly from an air line attached to the torch and a second air stream directed forwardly to the torch assembly from the box to further remove the loosened weld spatter from the nozzle assembly area. The box may also be connected to a vacuum line to aid in the removal of debris or residual cleaning media, or both.

Additionally an anti-spatter compound such as known detergents or the like may be added to the coolant medium, or separately applied, to further clean and protect the nozzle assembly if desired.

DETAILED DESCRIPTION

Figure 1:
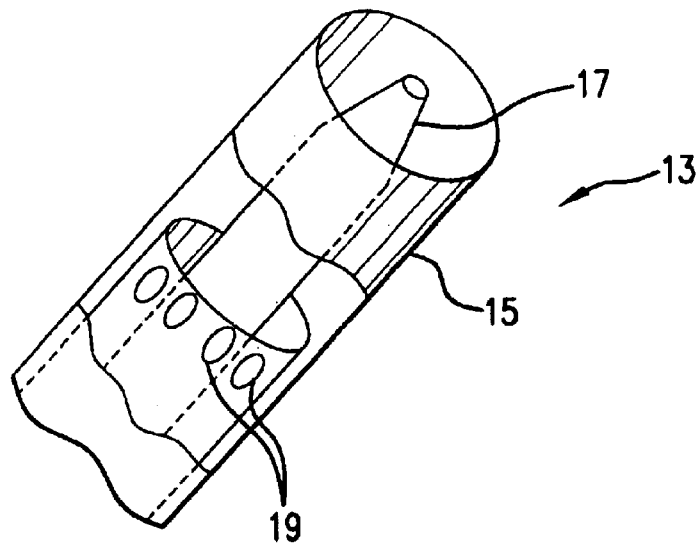
FIG. 1 illustrates a known welding torch nozzle assembly.

FIG. 1 shows a cutaway view of a known MIG/Mag welding torch 11 familiar to those in the art, which may be cleaned by using the system of the present invention. The torch includes a nozzle assembly 13 having a nozzle 15, a weld tip 17, and gas diffusers 19. Modification of the torch according to the present invention may include additional tubing 20 (FIG. 2) affixed to the rear end 21 of the torch 11 which provides a fluid under pressure to help clean the nozzle assembly 13 as further explained below.

Figure 2:
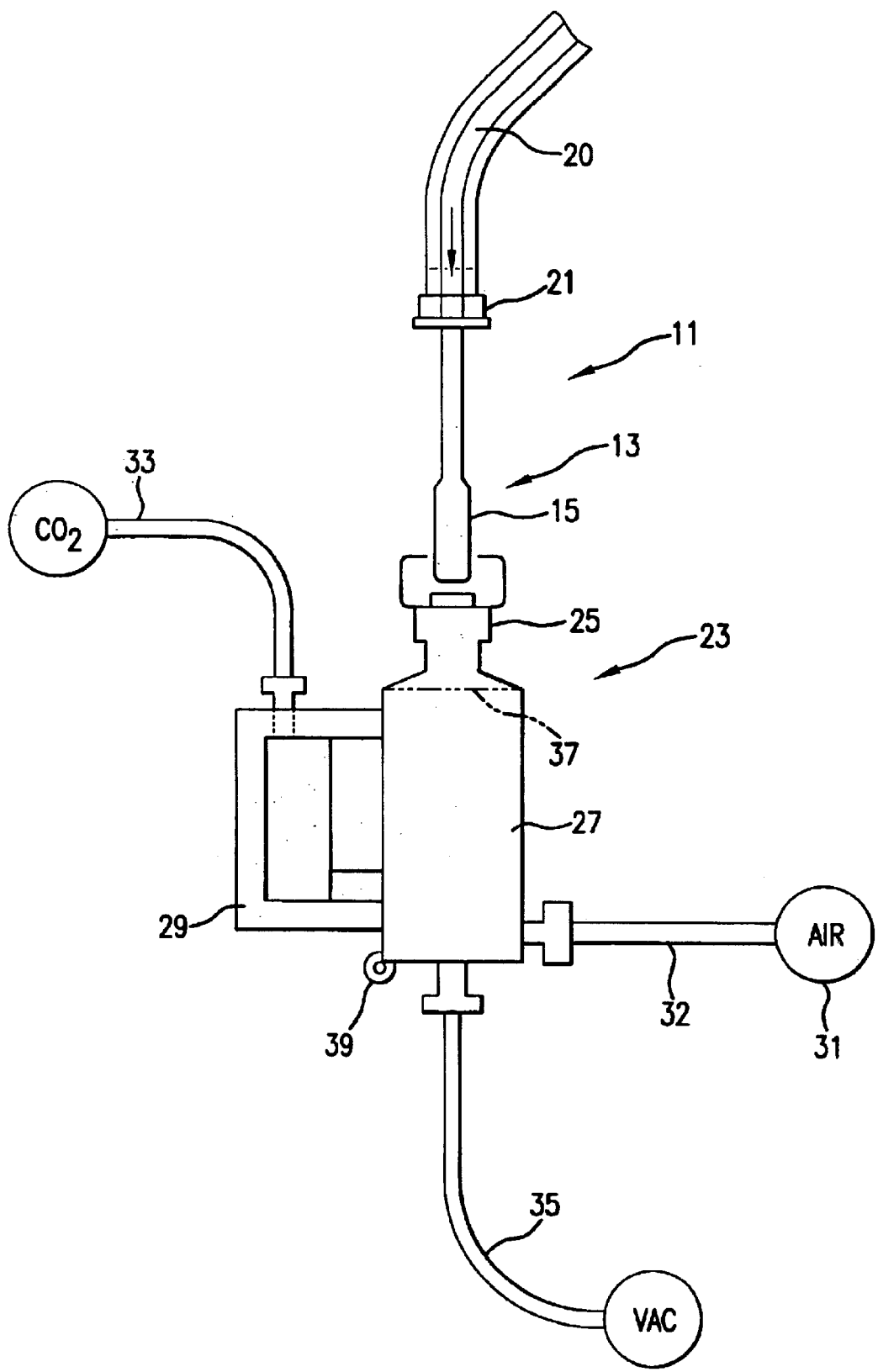
FIG. 2 illustrates a cleaning station and alternative nozzle assembly according to the present invention.

FIG. 2 illustrates a cleaning station 23 of the present invention. In an automated embodiment of the present invention, insertion of the nozzle assembly 13 into the cleaning station 23 will initiate the cleaning cycle by securing the nozzle 15 and initiating cooling by subjecting the warm nozzle assembly 13 to a pressure spray of coolant medium in and around the nozzle 15. Details of automating the apparatus and assembly, such as sensing and control apparatus and fluid routing, have been omitted for clarity of explanation and are considered with the ordinary skill of the art. With the application of the coolant medium, the resulting temperature shock effected on the surfaces of the nozzle assembly 13 aids in separating spatter from the nozzle assembly 13 without damage to the nozzle assembly surfaces.

The cleaning station 23, according to one embodiment of the invention comprises a pneumatic clamp assembly 25 such as known in the art for securing the nozzle assembly 13, a cleaning box 27 open to the clamp assembly 25, and a coolant delivery box 29 for supplying the coolant medium, if necessary or desired. The cleaning box 27 and pneumatic clamp assembly 25 may share an air supply 31. The air supply 31 may provide pneumatic force necessary to operate the pneumatic clamp assembly 25 through a first line 32 and may provide air as a pressurized cleaning or drying fluid to the cleaning box 27. The coolant delivery box 29 may be provided for accepting and routing pelletized cleaning medium such as dry ice pellets, granules or the like, as indicated by the coolant supply line 33 labeled "CO2", into the cleaning box 27. It will be appreciated that other coolant media may be used which are suitable to the task within the spirit of the present invention, such as a liquid nitrogen source, super-chilled air, etc. The cleaning media will preferably not leave a residue or source of free oxygen on the nozzle assembly 13 which might interfere with subsequent welding operations. Dry ice pellets or other solids may have an additional advantage of providing some mechanical action for removal of loosened spatter. The additional anti-spatter detergents or the like as mentioned above may be introduced anywhere in the coolant media flowpath if desired. Cleaning box 27 may further be provided with a vacuum line 35 for removal of used coolant media and associated spatter.

Alternatively, another embodiment of the present invention need not include the clamp assembly 25 as indicated by phantom line 37, leaving the cleaning box 27 largely open at the top. The cleaning box 27 may then be emptied of coolant media and spatter by pivoting it downward about a hinge 39. In such case the vacuum line 35 may not be required.

Figure 3:
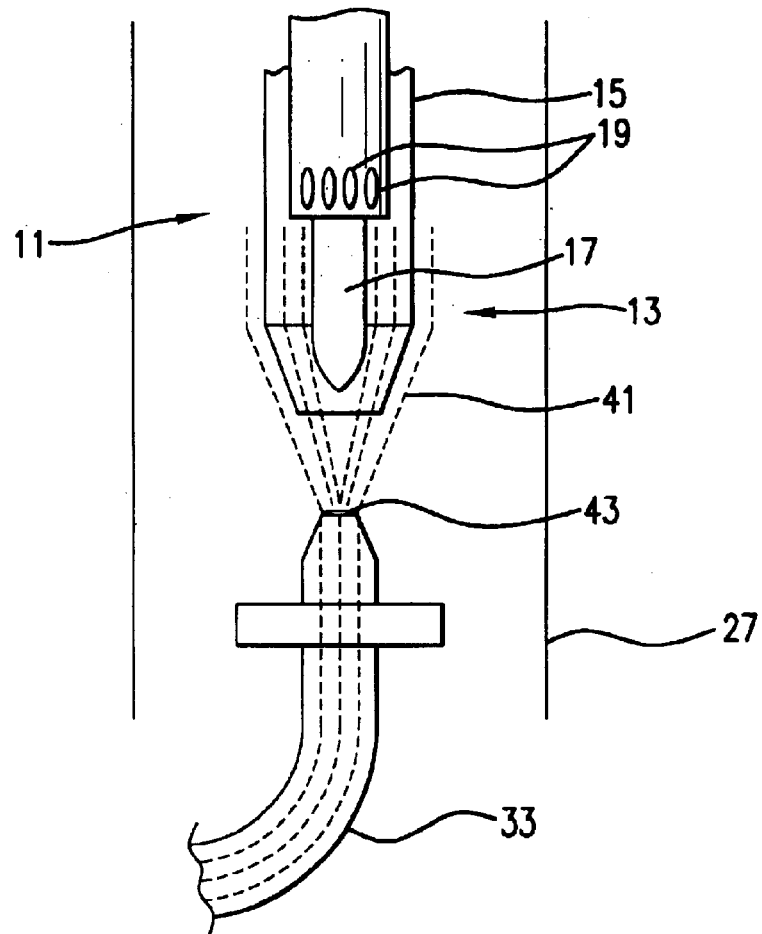
FIG. 3 illustrates a cut-away side view of the cleaning station with a welding torch nozzle assembly therein.

FIG. 3 illustrates a schematic interior view of the cleaning box 27 of the present invention with a coolant medium 41 being applied to the nozzle assembly 13. The nozzle assembly 13 is placed in the cleaning box 27 with the welding tip 17 facing the coolant supply line 33. Once the nozzle assembly 13 is in place in the cleaning box 27 adjacent the outlet 43 of the coolant supply line 33, the coolant medium 41 is applied to the area occupied by the nozzle assembly 13 to effect the temperature shock which will loosen and remove the spatter from all parts of the nozzle assembly 13. Blow-out air may then be introduced through the coolant supply line 33 or an additional line (not shown). Referring again to FIG. 2, the nozzle assembly 13 may further be in communication with a source of pressurized fluid, such as air or the like, provided through the nozzle assembly 13 such as by an additional air feed line 20 attached to the torch 11.

Having thus described a system including methods and apparatus for effecting a cleaning of weld spatter from a welding torch by means of cold temperature, it will be appreciated that many variations thereon will occur to the artisan upon an understanding of the present invention, which is therefore not to be limited to the described embodiments.

I claim:

1. A cleaning system for a welding torch, comprising:

means for subjecting the welding torch to a cooling sufficient to cause a temperature shock sufficient to loosen weld spatter from the welding torch.

2. The cleaning system of claim 1 wherein the means for subjecting includes means for subjecting a weld tip, nozzle and gas diffusers of the welding torch to said cooling.

3. The cleaning system of claim 1 further including means for carrying away loosened weld spatter.

4. The cleaning system of claim 3 wherein the means for carrying away further includes at least one of a positive and a negative fluid pressure.

5. The cleaning system of claim 1 wherein the means for subjecting further includes means for subjecting the welding torch to a pressurized flow of a pelletized cleaning medium.

6. The cleaning system of claim 5 wherein the pelletized cleaning medium includes dry ice pellets.

7. The cleaning system of claim 1 further including means for cleansing the torch with an anti-spatter compound.

8. The cleaning system of claim 7 further including means for applying the anti-spatter compound by mixture with a coolant medium sufficient to cause a temperature shock sufficient to loosen weld spatter from the welding torch.

9. The cleaning system of claim 1 further including a cleaning station for automatically securing the nozzle and initiating a pressure spray of coolant medium in and around the nozzle.

10. The cleaning system of claim 9 wherein the cleaning station further comprises a pneumatic clamp assembly for securing the nozzle assembly.

11. The cleaning system of claim 10 wherein the cleaning station further comprises a cleaning box open to the clamp assembly.

12. The cleaning system of claim 9 wherein the cleaning station further comprises a coolant delivery box for supplying the coolant medium.

13. The cleaning system of claim 9 wherein the cleaning station further comprises an air supply to provide at least one of a pneumatic force for operating a pneumatic clamp assembly and a pneumatic force for providing air as a pressurized cleaning or drying fluid for the welding torch.

14. The cleaning system of claim 1 further comprising a fluid supply line attached to the welding torch to provide a fluid force for providing a pressurized cleaning or drying fluid to the welding torch.

15. A method of cleaning a welding torch comprising:

subjecting the welding torch to a cooling sufficient to cause a temperature shock sufficient to loosen weld spatter from the welding torch.

16. The method of cleaning a welding torch of claim 15 further comprising carrying away loosened weld spatter.

17. The method of cleaning a welding torch of claim 15 further comprising subjecting the welding torch to a pressurized flow of a pelletized cleaning medium.

18. The method of cleaning a welding torch of claim 17 further comprising subjecting the welding torch to a pressurized flow of dry ice pellets.

19. The method of cleaning a welding torch of claim 15 further comprising cleansing the torch with an anti-spatter compound.

20. The method of cleaning a welding torch of claim 19 further comprising applying the anti-spatter compound by mixture with a coolant medium.

21. The method of cleaning a welding torch of claim 15 further comprising drying the welding torch with a source of pressurized fluid.

22. A cleaning system for a welding torch, comprising:

means external to the welding torch for subjecting external surfaces of a weld tip, nozzle and gas diffusers of the welding torch to a cooling medium sufficient to cause a temperature shock sufficient to loosen weld spatter from the welding torch.

23. The cleaning system of claim 22 wherein the means for subjecting includes means external to the welding torch for subjecting the welding torch to a cooling medium sufficient to cause a temperature shock sufficient to nonabrasively remove weld spatter from the welding torch.

24. The cleaning system of claim 23 wherein the means for subjecting includes means for contacting the weld spatter with the coolant medium.

25. The cleaning system of claim 24 further including means for cleansing the torch with an anti-spatter compound.

26. The cleaning system of claim 24 wherein the coolant medium includes dry ice pellets.

27. The cleaning system of claim 24 further comprising a fluid supply line attached to the welding torch to provide a fluid force for providing a pressurized cleaning or drying fluid to the welding torch which will not leave a residue or source of free oxygen on the welding torch.

* * * * *